United States Patent

Hinden et al.

[15] 3,701,878
[45] Oct. 31, 1972

[54] SHEET METAL RESISTANCE WELDING PIN

[72] Inventors: Milton Hinden, Massapequa, N.Y.; David Porat, Brookline, Mass.

[73] Assignee: Duro-Dyne Corporation, Farmingdale, N.Y.

[22] Filed: April 30, 1971

[21] Appl. No.: 138,901

[52] U.S. Cl. .......................................219/98, 85/11
[51] Int. Cl. ..............................................B23k 9/00
[58] Field of Search ...............219/98, 99; 85/11, 16; 287/20.2 WS

[56] References Cited

UNITED STATES PATENTS

| | | | |
|---|---|---|---|
| 1,605,695 | 11/1926 | Baloyan | 85/16 |
| 2,740,505 | 4/1956 | Flora | 85/11 X |
| 2,751,052 | 6/1956 | Flora | 85/11 X |
| 2,096,495 | 10/1937 | Hogg | 219/99 |

*Primary Examiner*—C. L. Albritton
*Attorney*—Mark T. Basseches and Paula T. Basseches

[57] ABSTRACT

A resistance welding pin formed of sheet metal adapted to attach insulation to a duct or the like. The pin includes a head portion and a shank portion and is characterized by the shank portion being folded, and including elements both substantially in the plane of and normal to the plane of the head. The portions of the shank disposed in the plane are recessed or cut away to define a weakened area to facilitate a controlled relative flexing movement between the shank and the head.

The pin includes a contact portion adapted to engage an electrode, the recessed or weakened portion being out of the circuit between the contact portion and the tip portion which is actually affixed to the duct.

10 Claims, 4 Drawing Figures

PATENTED OCT 31 1972

3,701,878

INVENTORS
MILTON HINDEN
DAVID PORAT

BY Mark Basseches

ATTORNEY

SHEET METAL RESISTANCE WELDING PIN

BACKGROUND OF THE INVENTION

1. Field of the Invention

This invention is in the field of resistance welding pins adapted to secure insulative material to duct surfaces.

In recent years in heating and cooling air conveying systems, the use of steel or like ducts having insulative material internally or externally supported thereon for purposes of reducing heat exchange between the conveyed fluid and the surrounding area have become increasingly popular. The use of insulation, as will be readily appreciated, materially increases the efficiency of the systems.

One of the methods for securing the insulation to the duct work which is gaining increasing acceptance is the use of resistance welding pins having tip portions adapted to be welded to the duct by being advanced through the material of the insulation into pressed contact with the duct surface. Examples of methods and apparatuses for effecting such welds may be found in my applications Ser. No. 797,603, now U.S. Pat. No. 3,582,603 entitled METHOD AND APPARATUS FOR ATTACHING INSULATION TO DUCT WORK; Ser. No. 49,253, now U.S. Pat. No. 3,591,763 entitled METHOD AND APPLICATOR PIN FOR ATTACHING INSULATOR MATERIAL TO DUCTS BY RESISTANCE WELDING; and Ser. No. 49,254, now U.S. Pat. No. 3,591,762 entitled WELDING APPARATUS.

2. The Prior Art

Heretofore resistance welding pins for attaching insulation have comprised one or two part cylindrical shanks having a sharpened tip at one end and an enlarged head at the other end. In the welding, the head, which is generally of conical configuration, is melted to define an essentially circular puddle or weld area of attachment to the duct. The connection between such welding pins and the duct material has been found to be durable and reasonably resistant to forces acting to fracture or dislodge the weld connection.

It will be appreciated that in some instances the sheet metal with the insulative material already attached may be stacked, shipped and/or subjected to forming steps, such as bending, etc. Accordingly, the ability of the welding pin to resist separation from the duct is an important attribute of an attached welding pin.

Certain drawbacks inhere in connection with welding pins of the type described, i.e., of cylindrical shanks and large circular heads. Among such drawbacks may be mentioned high expense of fabricating the cylindrical type pins, and the large cubic area occupied by each such pin, with resultant bulkiness of packages containing a large quantity of pins.

Experiments intended to enable the production of a satisfactory welding pin fabricated of sheet metal have been undertaken, but such experiments have been unsuccessful prior to the present invention.

Initial experimental sheet metal resistance welding pins have been found to provide only a weak weld connection. In instances where the weld connection was found satisfactorily to resist tensile forces exerted against the pin and tending to draw the pin away from the duct, the weld has been deficient in resisting lateral tilting forces exerted against the head, with a resultant separation of the weld.

In many instances, in order to achieve a satisfactory conductivity relation between the tip of the weld pin and the duct, considerable forces must be exerted against the shank of the weld pin in the direction of the duct. Such forces are required by the occasional presence of scale or bits of insulation, adhesive, etc. between the tip of the pin and the duct. Many of the sheet metal resistance welding pins tested have become bent or distorted before the pressures necessary to secure a proper weld have been developed.

To overcome these objections, experimental sheet metal pins of progressively heavier gauge were fabricated and tested. While such heavier gauge pins facilitate the development of satisfactory welding pressures, the pins, once attached, did not provide a connection satisfactorily able to resist fracturing of the weld, especially responsive to tilting forces exerted against the head.

The heavier gauge pins had, in addition, the obviously undesirable characteristics of increased cost, and required the use of heavier, and hence intricate and expensive, blanking and die forming equipment.

SUMMARY OF THE INVENTION

The present invention may be summarized as relating to a resistance welding pin fabricated of sheet metal comprising a head and shank, the shank terminating in a sharpened tip. The shank is bent at right angles along the length thereof and includes portions disposed in the plane of the head. The junction of the shank and head is defined by a weakened area, providing a degree of flexibility between the shank and the head so that substantial components of stresses applied to the head are not transmitted to the shank but, rather, application of such stresses induces a yieldability and flexural movement between the head and the shank.

The shank includes a contact portion, which portion is disposed between the tip of the shank and the junction of the shank and head, the contact portion forming the position for the application of the primary compressive forces exerted against the pin to achieve a weld. By this means, the low resistance area defined by the weakened connection between the shank and the head is not in the current flow path utilized in the attachment of the welding pin.

Optionally but preferably, the contact portion is disposed to the side of the plane of the head opposite from the tip of the shank. The shank portion between the contact portion and the tip is preferably bent or folded about a bend or fold axis extending longitudinally of the noted portion of the shank to define an essentially three dimensional shank portion.

In a preferred embodiment, the welding pin is formed from an essentially square metal blank, the shank defining portion being separated from the remainder of the blank by a pair of slits extending parallel to and to opposite sides of a diagonal of such square. The slits preferably extend beyond the intersection with the other diagonal of the square, i.e., are cut across more than half of the diagonal length of the blank.

Preferably the terminal ends of the slits defining the junction of the shank and the head include enlargements or recess cutouts extending into the shank to define a bend or flexure area extending transversely of the shank. Flexure in this area may be facilitated by the provision of multiple score lines or recesses extending transversely of the shank in this area. Preferably additional score lines extending normal to the first mentioned score lines may be provided to enable the head to tilt in a direction perpendicular to the tilt direction permitted by the first mentioned transverse score lines.

The thus formed shank is preferably bent at right angles transversely so that the tip which is defined by a corner of the original blank is displaced to one side of the plane of the head.

The tip is sharpened either by a grinding or swaging operation, to provide a point of the smallest possible area.

Preferably the transverse bend in the shank is disposed to the side of the plane of the head opposite from the tip so that welding pressures urging the tip against a duct will be mainly or exclusively transmitted through the shank.

Preferably the portion of the shank between the bend and the tip is bent about a bend or folding axis which extends longitudinally of such portion to a three dimensional configuration.

It is accordingly an object of the invention to provide a resistance welding pin which is comprised of sheet metal.

A further object of the invention is to provide a pin of the type described wherein the requisite pressures for achieving a satisfactory weld may be readily developed without danger of distorting the pin.

Still a further object of the invention is the provision of a resistance welding pin of the type described which will, after connection to a duct or the like, be effective to hold the insulation in a selected position and to protect the weld from the tendency to fracture or become dislodged responsive to stresses in any direction applied against the head of the pin.

It is a still further object of the invention to provide a sheet metal resistance welding pin which may be inexpensively manufactured and which is susceptible to being nested or stacked so as to enable packaging of a multiplicity of pins in a relatively small container.

To attain these objects and such further objects as may appear herein or be hereinafter pointed out, reference is made to the accompanying drawings, forming a part hereof, in which.

Figure 1:
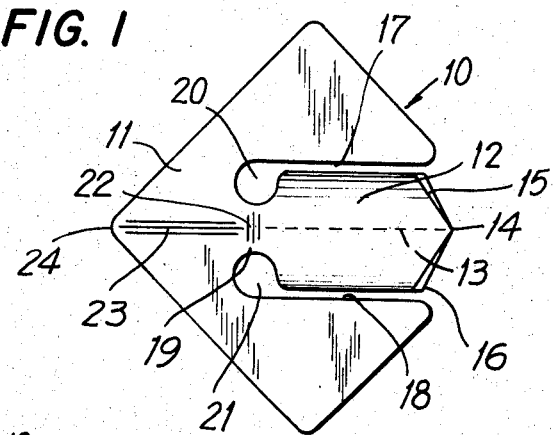
FIG. 1 is a plan view of a metal blank from which the pin is formed.

Referring now to the drawings, the resistance welding pin in accordance with the invention comprises a metal blank member 10 which is essentially square in plan. The blank, which is preferably formed in a stamping operation, may be of approximately 18 gauge metal where the same is to be used with welding apparatus having about 60 amperes welding current.

The welding pin may include a head portion 11 and a shank 12. The longitudinal axis 13 of the shank 12 preferably coincides with one of the diagonals of the square blank 10.

The shank 12 terminates in a sharpened tip 14, the sharpness of the tip resulting both from the fact that the tip coincides with the corner configuration of the shank plus the angularly directed bevels 15, 16. It will be appreciated that the bevels may be formed on one or both sides to provide a tip 14 which is as sharp as possible, defining a cross sectional area which is only a small fraction of the area of the major length of the shank.

The shank 12, which is formed in the course of the stamping operation, is defined by a pair of elongated cutouts 17, 18, which cutouts generally parallel the diagonal 13 and are spaced to opposite sides thereof.

It will be observed that the junction portion or neck 19 of the shank, where the shank merges into the head 11, is narrowed as respects the major length of the shank. The narrow neck 19 is defined by enlarged cutout portions 20, 21 formed at the end of the slits 17, 18, respectively. Preferably in the same operation, or in a separate operation, the neck portion 19 is scored, as at 22, with transversely extending score lines, such lines having the effect of reducing the forces required to bend or flex the head of the welding pin relative to the shank about a bending axis which parallels the neck area.

Optionally, an additional set of diagonally directed score lines 23 extend outwardly from the neck area 19 to the corner 24 opposite the tip 14, it being understood that the score lines 23 permit relative pivotal movement between the head and the shank about an axis perpendicular to the pivot axis provided by the score lines 22.

Figure 2:
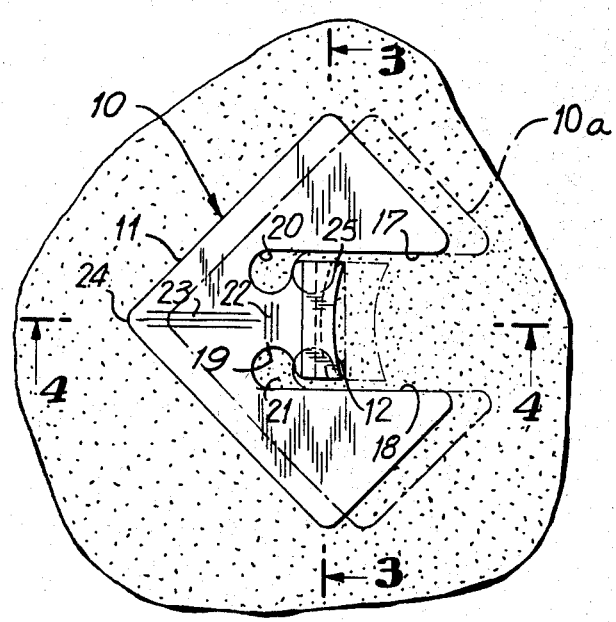
FIG. 2 is a plan view of the blank in position for engagement.
Figure 4:
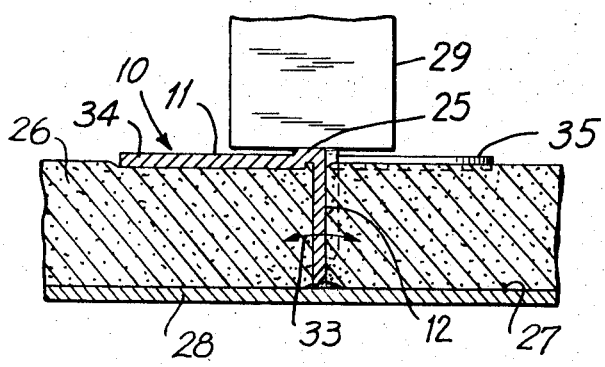
FIG. 4 is a cross section taken on the line 4—4 of FIG. 2.

As best understood by an inspection of FIGS. 1, 2 and 4, the shank portion 12 is preferably bent to an arcuate conformation or to a like three dimensional attitude so as to increase the rigidity thereof.

It will be understood that the bending or folding step is preferably carried out about a bending or folding axis parallel with the diagonal 13. The bending step may be carried out in the same apparatus employed to blank or stamp the member 10, or in a separate operation.

The thus formed blank is thereafter bent to define a completed weld pin by a single or multiple fold step which forms the pin to the configuration seen in FIG. 4. Preferably the shank is not defined by a single right angle bend but, rather, is formed by multiple folds which define a raised contact area 25 —see FIGS. 2 and 4, which area is preferably disposed in a plane above or to the side of the plane defined by the head 11 opposite from the side occupied by the tip 14. As best seen in FIG. 2, it is important to note that the contact area 25 is disposed between the reduced neck 19 and the tip 14.

The method of applying the welding pin does not vary significantly from that described in my aforementioned United States patent applications. Specifically, the insulation material 26 which has previously been disposed against the surface 27 of the duct 28 is locked to the surface by pressing the tip 14 downwardly into contact with the duct 28 through the application of a force against the contact portion 25 by an electrode member 29. It will be appreciated that since the contact portion is preferably disposed in a plane above the head, downward pressure exerted by the electrode is not transmitted to the head proper but, rather, to the contact portion. By reason of the arcuate configuration of the shank 12 substantial downward pressure by the electrode may be effected without bending or deflection of the shank.

When a sufficient pressure is achieved, a welding current is passed through the shank, the circuit path of such current being from the contact portion, through the length of the shank, and into the duct 28, the duct of course having previously been connected to the other electrode in the welding system. The passage of welding current will effect a melting of the portion of the shank of smallest cross section, i.e., the tip, the moulten material fusing with the metal of the duct to effect a firm attachment. The attachment of the pin to the duct provides a reasonably high tensile strength connection between the aforementioned parts.

Figure 3:
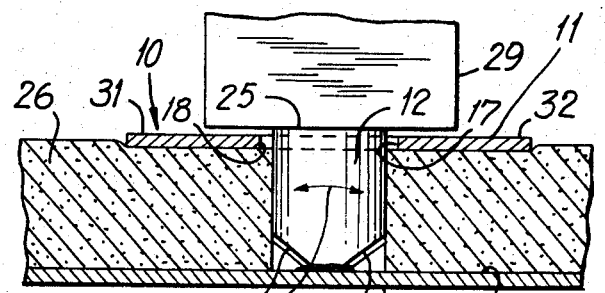
FIG. 3 is a cross section taken on the line 3—3 of FIG. 2.

By reason of the relatively wide but thin configuration of the shank portion, it will be observed that the weld which is formed provides a connection which is resistant to fracture responsive to the application of rocking forces in the direction of the arcuate arrow 30, FIG. 3. In other words, since an elongated weld formation is defined, rocking in the direction of the arrow 30 is unlikely to fracture the connection between the pin and the duct.

It will be appreciated that such rocking forces would be applied responsive to a downward pressure exerted against portions 31 or 32 of the head of the weld pin. When viewed in the direction of FIG. 4, however, it will be appreciated that a fracture of the weld would be far more likely if a rocking force in the direction of the area 33 were applied to the shank. This greater tendency to fracture is occasioned by the short lever arm due to the narrow extent of the weld.

In other words, referring back to FIG. 3, it will be appreciated that, due to the length of the weld, the forces which tend to lift and fracture the weld may be satisfactorily combatted, whereas the same is not true in the orientation shown in FIG. 4. It is the tendency of weld pins to become separated when subjected to stresses shown in the direction of the arrow 33 that has heretofore precluded the use of sheet metal welding pins wherein the transverse extend of the shank greatly exceeds the thickness thereof.

I have discovered that by the provision of the weakened neck area 19 alone or when coupled with the transverse scoring 22, forces which would tend to stress the shank in a weld breaking direction represented by the arrow 33, FIG. 4, are absorbed in large measure by a flexure of the head relative to the shank. Thus, a downward pressure at the points 34, 35 will not result in the application of substantial tilting forces to the shank 12. Instead, the head will tend to tilt about the axis of the line 22 extending transversely of the neck, with the transmission of only minimal tilting forces to the shank proper.

A phase of the inventive concept hereof may thus be said to lie in the unobvious and unexpected provision of a welding pin which is rendered less likely to separation from a duct by weakening or reducing the strength of portions of the pin proper, so as to channel the forces applied against the pin in directions least likely to induce a fracture of the weld.

To a lesser degree, the score lines 23 permit some measure of flexure of the weld relative to the shank. However, as noted above, the pin is not likely to be dislodged responsive to tilting forces applied in the plane of the major faces of the shank.

It is important to note that the contact area 25 is formed between the narrowed neck area and the tip of the shank. By disposing the contact portion at this position, and by locating the contact portion above the level of the plane of the head, the narrowed neck portion will not lie within the path of the welding current. Thus, there is no substantial tendency for localized overheating in the neck area, as would otherwise be the case if the neck were in the current flow path or if the contact portion at the time of welding were not above or at least in the plane of the head.

Preferably the contact portion 25 provides a flat area parallel with the head so that the downward forces against the pin which are exerted by the welding electrode 29 are transmitted through a large contact area parallel with the under surface of the electrode and the upper surface of the duct.

From the foregoing it will be appreciated that there is provided a sheet metal resistance welding pin particularly adapted for securing insulation to the surface of a duct, the weld connection between the pin and the duct being resistant to dislodgment or fracture responsive to the forces most often encountered by the pin.

It will be further understood that welding pins of the present invention may be compactly packaged in partially nesting condition, as shown in FIG. 2 for instance, wherein a second welding pin 10a has its head disposed atop the pin 10, with the shank of the pin 10a disposed within the opening defined by the downwardly bent shank 12 of the pin 10.

By providing a contact portion for the electrode so located that the current path does not traverse the weakened neck portion, the danger of localized overheating in the course of forming the weld is eliminated.

It will be readily appreciated that a wide gamut of variations in the form of welding pins may be made without departing from the spirit of the concepts hereinabove disclosed. By way of example, the shape of the head, the shape of the shank, the shape and position of the weakened flexure points in the shank, etc., may be varied within a reasonably wide range, with the thus formed pins nonetheless incorporating the advances of the present invention. Accordingly, the invention is to be broadly construed within the scope of the appended claims.

Having thus described the invention and illustrated its use, what is claimed as new and is desired to be secured by Letters Patent is:

1. A resistance welding pin integrally formed of sheet metal for attaching insulation to a duct or the like comprising a head and a shank, said shank being elongated and bent at right angles to said head, and including a sharpened tip at its free end disposed to one side of the plane of said head, a contact portion formed on said shank to the opposite side of said plane in the area between said bend and the junction of said shank and head, and recess portions defining a weakened area of said shank, said recess portions being disposed between said junction and said contact portion of said shank.

2. The pin of claim 1 and including weakened score lines extending transversely of said shank in the area between said junction and said contact portion.

3. A resistance welding pin for attaching insulation to a duct or the like, said pin being integrally formed of an essentially square sheet metal blank, said pin including a head portion and a shank, said shank being defined by a spaced pair of slits paralleling and spaced to opposite sides of a diagonal of said square, the corner of said square included between said slits defining the tip of said pin, said shank being bent substantially at right angles in the area between said tip and the junction of said shank and said head.

4. A resistance welding pin in accordance with claim 3 wherein said tip is bevelled in an angular direction with respect to the plane of said shank to define a sharpened point.

5. A resistance welding pin in accordance with claim 3 wherein said shank is recessed in the area between said bend and said junction to define a weakened portion of said shank.

6. A resistance welding pin in accordance with claim 5 and including score lines extending transversely of said weakened portion of said shank.

7. A resistance welding pin of claim 6 and including score lines in said head extending substantially normal to said transverse score lines toward said corner of said blank opposite said tip.

8. A resistance welding pin in accordance with claim 3 wherein said shank portion between said bend and said tip is bent to a three dimensional configuration about a bend axis parallel with the length of said shank portion.

9. A resistance welding pin in accordance with claim 3 wherein said right angular bent portion of said shank is disposed to one side of the plane of said head and said tip is disposed to the other side of said plane.

10. As a new article of manufacture, a nested stack of resistance welding pins for attaching insulation to a duct or the like, the pins of said stack each defining an integral sheet metal element comprising a head portion and a shank portion bent at right angles to said head portion and terminating in a sharpened tip, the shank portion of each pin being formed by a pair of slits extending inwardly from the perimeter of said head portion, the distance between all opposed portions of the walls defining said slits being greater than the transverse dimension of said shank at the portion of said shank immediately below said head, said welding pins being stacked with the under surface of the head portion of each pin disposed parallel to and adjacent the upper surface of the head portion of the next lower pin and the shank portion of each upper pin extending downwardly through the space defined between the slits of the next lower pin and lying in parallel adjacent relation to the shank of said lower pin, whereby each pin may be moved laterally relative to the next adjacent pin in a separating direction of said shanks without interference between said pins, the longitudinal axis of the shank of any pin in said stack being angularly related to a line extending through the tips of said stacked pins.

* * * * *